(12) United States Patent
Mereddy et al.

(10) Patent No.: US 7,111,118 B2
(45) Date of Patent: Sep. 19, 2006

(54) HIGH PERFORMANCE RAID MAPPING

(75) Inventors: Pramodh K. Mereddy, Wichita, KS (US); Lance A. Lesslie, Haysville, KS (US)

(73) Assignee: LSI Logic Corporation, Milpitas, CA (US)

( * ) Notice: Subject to any disclaimer, the term of this patent is extended or adjusted under 35 U.S.C. 154(b) by 307 days.

(21) Appl. No.: 10/681,757

(22) Filed: Oct. 8, 2003

(65) Prior Publication Data

US 2005/0080990 A1    Apr. 14, 2005

(51) Int. Cl.
*G06F 12/00* (2006.01)
(52) U.S. Cl. ............... 711/114; 711/112; 711/4; 714/100
(58) Field of Classification Search ........... 711/114, 711/112, 4; 714/100, 1, 6
See application file for complete search history.

(56) References Cited

U.S. PATENT DOCUMENTS

| 5,537,567 A | * | 7/1996 | Galbraith et al. | ........... 711/114 |
| 6,170,037 B1 | * | 1/2001 | Blumenau | ........... 711/114 |
| 6,502,166 B1 | * | 12/2002 | Cassidy | ........... 711/114 |
| 2002/0188800 A1 | * | 12/2002 | Tomaszewski et al. | ...... 711/112 |

* cited by examiner

*Primary Examiner*—Kimberly McLean
(74) *Attorney, Agent, or Firm*—Christopher P. Maiorana, P.C.

(57) ABSTRACT

An apparatus generally having a plurality of disk drives and a controller is disclosed. Each of the disk drives may have a first region and a second region. The first regions may have a performance parameter faster than the second regions. The controller may be configured to (i) write a plurality of data items in the first regions and (ii) write a plurality of fault tolerance items for the data items in the second regions.

16 Claims, 7 Drawing Sheets

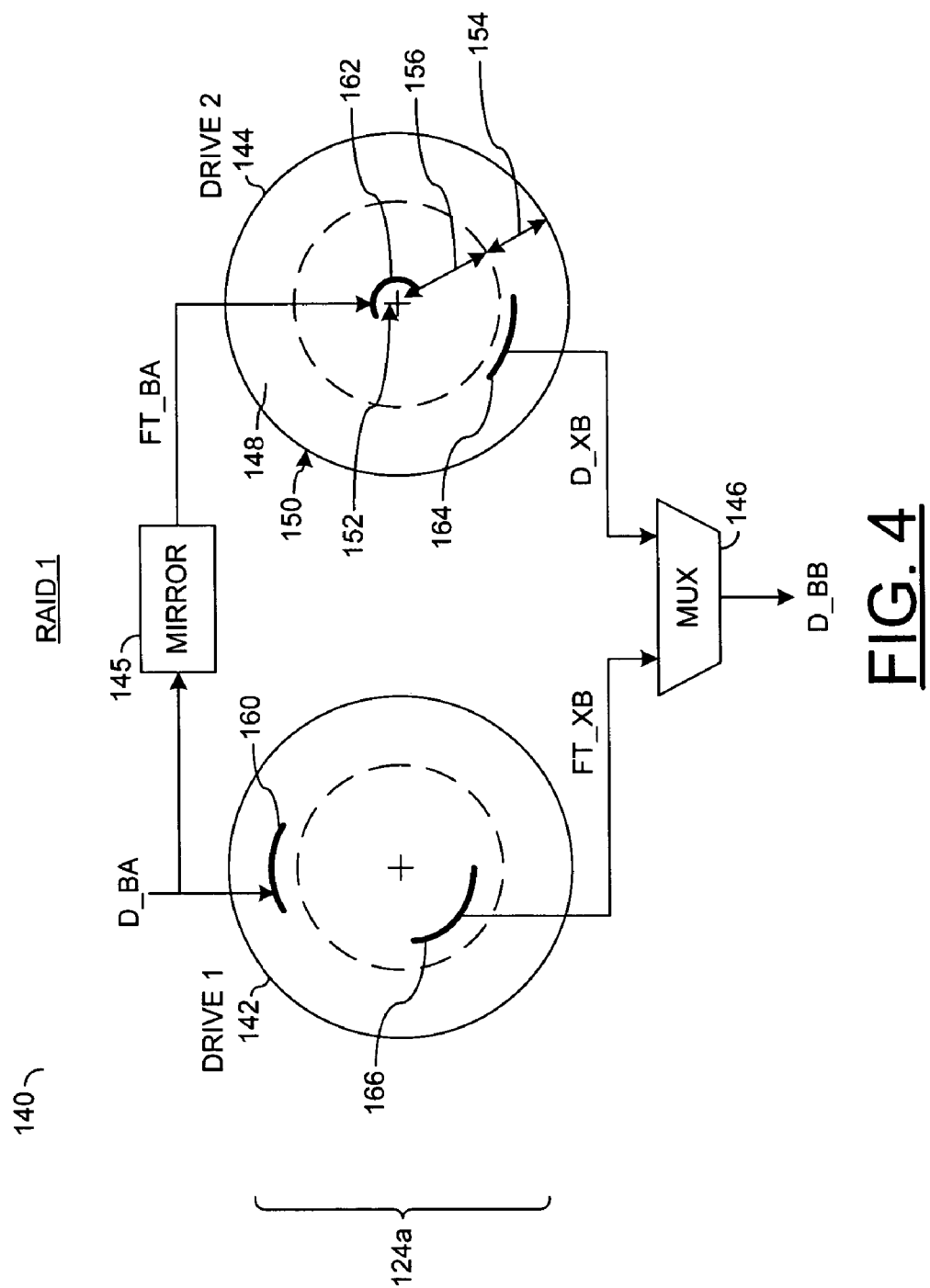

HIGH PERFORMANCE RAID MAPPING

FIELD OF THE INVENTION

The present invention relates to a disk drive arrays generally and, more particularly, to an apparatus and method for mapping in a high performance redundant array of inexpensive disks.

BACKGROUND OF THE INVENTION

Circular disk media devices rotate at a constant angular velocity while accessing the media. Therefore, a read/write rate to and from the media depends on the particular track being accessing. Access rates conventionally increase as distance increases from a center of rotation for the media. Referring to FIG. 1, a block diagram illustrating a conventional mapping for a redundant array of inexpensive disks (RAID) level 1 system is shown. The RAID 1 system is commonly viewed by software as a virtual disk 10 having multiple contiguous logical block addresses (LBA). Each virtual LBA may be stored on a data drive 12 at a physical LBA. Each physical LBA may also be mirrored to and stored in a parity drive 14. Therefore, each virtual LBA is stored at the same physical LBA location in both the data drive 12 and the parity drive 14.

The RAID 1 system can be implemented with more than two disk drives. An equal number of data drives 12 and parity drives 14 will exist for the RAID 1 virtual disk 10 with each of the parity drives 14 containing a mirror image of a data drive 12. Furthermore, access time to the virtual disk 10 will increase as a position of the LBA number moves closer (i.e., increases) to the axis of rotation for the disk drive media. In the LBA mapping scheme illustrated, a random read performance of the RAID 1 virtual disk 10 matches that of either single disk 12 or 14.

SUMMARY OF THE INVENTION

The present invention concerns an apparatus generally comprising a plurality of disk drives and a controller. Each of the disk drives may have a first region and a second region. The first regions may have a performance parameter faster than the second regions. The controller may be configured to (i) write a plurality of data items in the first regions and (ii) write a plurality of fault tolerance items for the data items in the second regions.

The objects, features and advantages of the present invention include providing an apparatus and/or method that may (i) improve random access read performance, (ii) improve overall read performance, (iii) utilize different access rates in different regions of a medium, (iv) provide a fault detection capability and/or (v) enable data recovery upon loss of a drive.

BRIEF DESCRIPTION OF THE DRAWINGS

These and other objects, features and advantages of the present invention will be apparent from the following detailed description and the appended claims and drawings in which:

FIG. 4 is a block diagram of an example implementation of a high performance RAID 1 apparatus;

DETAILED DESCRIPTION OF THE PREFERRED EMBODIMENTS

Figure 2:
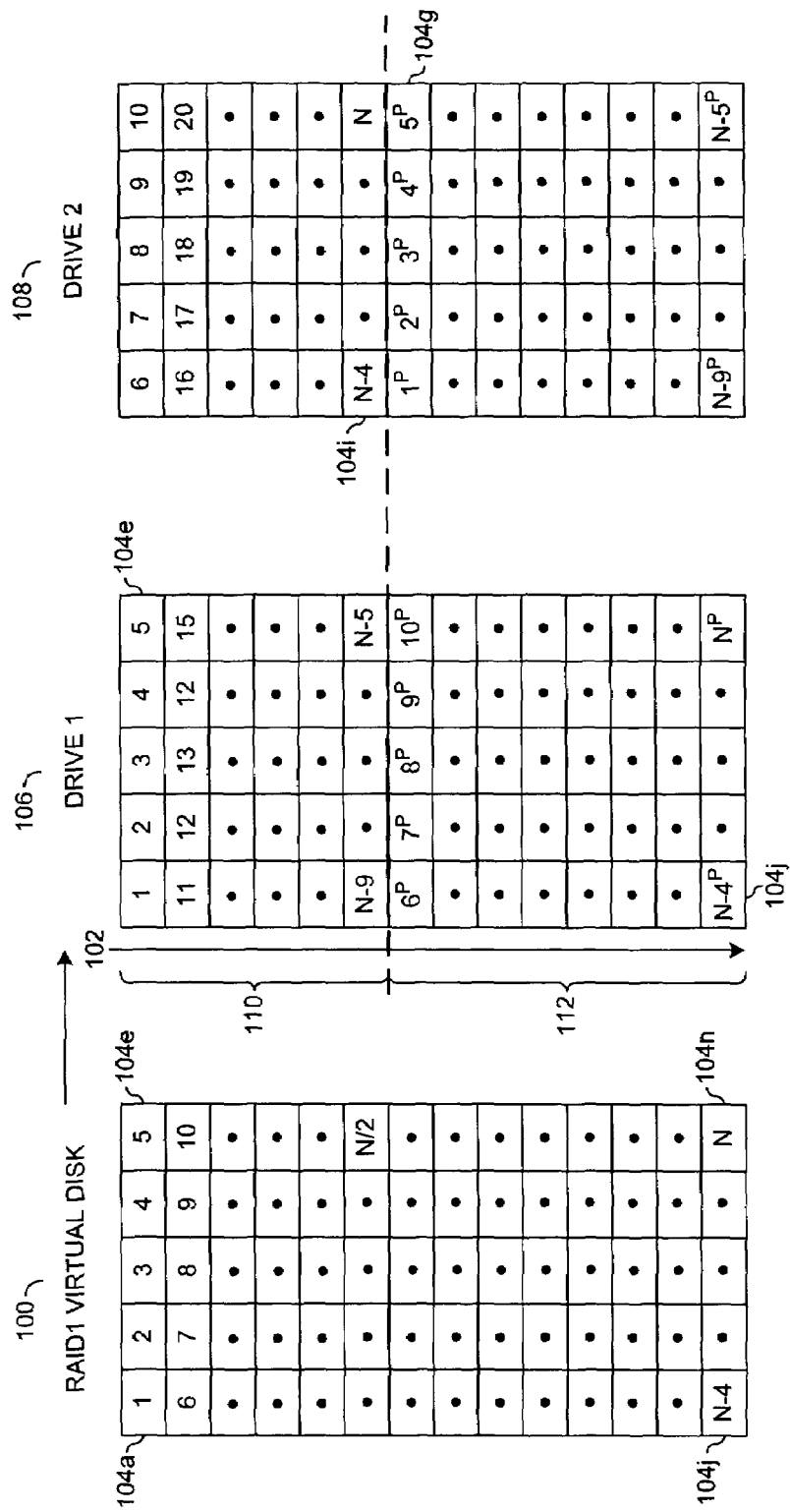
FIG. 2 is a block diagram of a mapping for a virtual disk in accordance with a preferred embodiment of the present invention.

Referring to FIG. 2, a block diagram of a mapping for a virtual disk 100 is shown in accordance with a preferred embodiment of the present invention. The present mapping scheme is generally based on a physical orientation and one or more properties of circular disk media. The virtual disk 100 may have an overall address range 102 divided into N logical block addresses (LBA) 104a–104n. Generally, the LBAs 104a–104n may be disposed within the address range 102 with a first LBA 104a having a lowest address number and a last LSB 104n having a highest address number. Other addressing arrangements may be implemented to meet the criteria of a particular application.

The virtual disk 100 may be mapped into two or more disk drives 106 and 108. The disk drives 106 and 108 may be arranged and operated as a level 1 redundant array of inexpensive disks (RAID). The disk drive 106 may be designated as first drive (e.g., DRIVE 1). The disk drive 108 may be designed as a second drive (e.g., DRIVE 2). The mapping may be organized such that the primary virtual to physical association may locate data in higher performance areas (e.g., a data region) of the disk drives 106 and 108 while parity or fault tolerance information is located in lower performance areas (e.g., a parity region) of the disk drives 106 and 108.

Each block of data for a particular LBA (e.g., 104x) of the virtual drive 100 may be primarily mapped in either the first drive 106 or the second drive 108, depending upon the address value for the particular LBA 104x. A mirror of the data for the particular LBA 104x may be mapped at a different location in the other drive. In one embodiment, the LBAs 104a–104n within a first address range 110 of the overall address range 102 may be mapped primarily to the first drive 106 and mirrored to the second drive 108. The LBAs 104a–104n within a second address range 112 of the overall address range 102 may be mapped primarily to the second drive 108 and mirrored to the first drive 106.

Each of the disk drives 106 and 108 is generally arranged such that one or more performance parameters of a media within may be better in the first address range 110 as compared with the second address range 112. In one embodiment, a bit transfer rate to and from the media may be faster in the first address range 110 than in the second address range 112. Therefore, data may be read from and written to the media at different rates depending upon the address. For rotating media, the performance generally increases linearly as a distance from an axis of rotation increases.

Mapping may be illustrated by way of the following example. Data (e.g., 5) at the LBA 104e from the virtual disk 100 may be mapped to the same LBA 104e for the first disk 106 since the address value for the LBA 104e is in the first address range 110. A mirror image of the data (e.g., $5^P$) from the virtual disk 100 LBA 104e may be mapped to a different address (e.g., 104g) in the second drive 108. Furthermore, data (e.g., N-4) at the LBA 104j for the virtual disk 100 may be mapped to the LBA 104i in the second disk 108 since the address value of the LBA 104j is within the second address range 112. A mirror image of the data (e.g., N-$4^P$) from the virtual disk 100 LBA 104j may be mapped to the same address (e.g., LBA 104j) in the first disk 106.

Any subsequent read for the data 5 or the data N-4 generally accesses the first drive 106 or the second drive 108 respectively from within the faster first address range 110. By comparison, a conventional RAID 1 system would have mapped the data N-4 into the second address range 112 of the first drive 106. Therefore, conventional accessing of the data N-4 within the second address range is generally slower than accessing the data N-4 within the first address range of the second drive 108 per the present invention. Overall, a random read performance and/or a general read performance of the RAID 1 virtual disk 100 may be better than the performance of the individual disk drives 106 and 108. Experiments performed on a two-disk RAID 1 system implementing the present invention generally indicate that a performance gain of approximately 20% to 100% may be achieved for random reads as compared with a conventional RAID 1 mapping.

Figure 1:
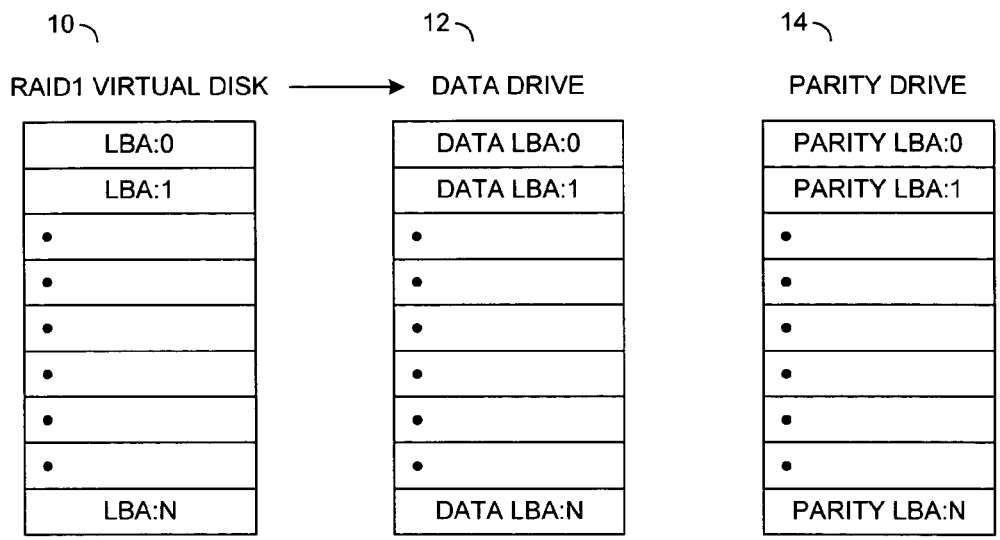
FIG. 1 is a block diagram illustrating a conventional mapping for RAID 1 system.
Figure 3:
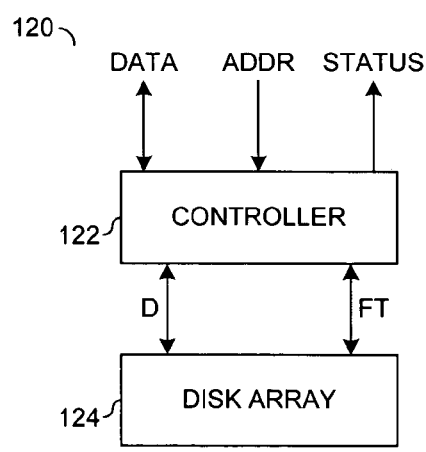
FIG. 3 is a block diagram of an example implementation of a disk array apparatus.

Referring to FIG. 3, a block diagram of an example implementation of a disk array apparatus 120 is shown. The apparatus 120 generally comprises a circuit (or device) 122 and a circuit (or device) 124. The circuit 122 may be implemented as a disk array controller. The circuit 124 may be implemented as a disk array (e.g., a RAID configuration). A signal (e.g., DATA) may transfer data items to and from the controller 122. A signal (e.g., ADDR) may transfer an address associated with the data to the controller 122. One or more optional signals (e.g., STATUS) may present status information from the controller 122. One or more signals (e.g., D) may exchange the data items between the controller 122 and the disk array 124. One or more signals (e.g., FT) may exchange fault tolerance items between the controller 122 and the disk array 124.

The controller 122 may be operational to map the information in the signal DATA to the individual disk drives within the disk array 124. The mapping may be dependent on the particular configuration of disk drives than make up the disk array 124. The disk array 124 may be configured as a level 1 RAID, a level 5 RAID, a level 6 RAID, a level 10 RAID or a level 0+1 RAID. Other RAID configurations may be implemented to meet the criteria of a particular application.

The signal DATA may carry user data and other data to and from the apparatus 120. The data items within the signal DATA may be arranged in blocks, segments or the like. Addressing for the data items may be performed in the signal ADDR using logical blocks, sectors, cylinders, heads, tracks or other addressing scheme suitable for use with the disk drives. The signal STATUS may be deasserted (e.g., a logical FALSE level) when error detection circuitry within the controller 122 detects an error in the data read from the disk array 124. In situations where no errors are detected, the signal STATUS may be asserted (e.g., a logical TRUE level).

The signal D may carry the data information. The data information may be moved as blocks or stipes to and from the disk array 124. The signal FT may carry fault tolerance information related to the data information. The fault tolerant information may be moved as blocks or stipes to and from the disk array 124. In one embodiment, the fault tolerant information may be mirrored (copied) versions of the data information. In another embodiment, the fault tolerance information may include error detection and/or error correction items, for example parity values.

Referring to FIG. 4, a block diagram of an example implementation of a high performance RAID 1 apparatus 140 is shown. In the example, the disk array 124 may be implemented with a first disk drive 142 and a second disk drive 144 (e.g., collectively a disk array 124a). Additional disk drives may be included in the disk array 124a to meet the criteria of a particular application. The controller 122 may be include a circuit (or block) 145 and a multiplexer 146.

The high performance RAID 1 mapping method generally does not assign a distinct data drive and a parity drive. Instead, the fault tolerance/parity items may be rotated among all of the drives. The data items may be stored in the higher performance regions (e.g., faster address ranges) and the parity items may be stored in the lower performance regions (e.g., slower address ranges) of the media. Each disk drive 142 and 144 generally comprises one or more disk media 148. Each medium 148 may have an outer edge 150 and an axis of rotation 152.

Each medium 148 may be logically divided into two regions 154 and 156 based upon the addressing scheme used by the drive. The first region 154 generally occupies an annular area proximate the outer edge 150 of the medium 148. The first region 154 may be addressable within the first address range 110. Due to a high bit transfer rate, the first region 154 may be referred to as a high performance region.

The second region 156 may occupy an annular area between the first region 154 and the axis of rotation 152. The second region 156 may be addressable within the second address range 112. Hereafter, the second region 156 may be referred to as a low performance region. In one embodiment, the high performance region 154 and the low performance region 156 may be arranged to have approximately equal storage capacity on each active surface of each media 148. In another embodiment, the storage capacity of the high performance region 156 may be greater than the storage capacity of the low performance region 156. For example, in a RAID 5 configuration having n drives, the high performance region 154 may occupy an (n-1)/n fraction of the medium 148 and the low performance region 156 may occupy a 1/n fraction of the medium 148. Generally, the delineating of the high performance region 154 and the low performance region 156 may be determined by criteria of the particular RAID process being implemented.

Other partitions may be made on the media 148 to account for multiple virtual drives on the physical drives. For example, a first high performance region 154 and a first low performance region 156 allocated to a first virtual RAID may be physically located adjoining the outer edge 150, with the first high performance region 156 outside the first low performance region 156. A second high performance region (not shown) and a second low performance region (not shown) may be physically located between the first low performance region 156 and the axis 152. In another example, the first and the second high performance regions may be located outside the first and the second low performance regions. Other partitions among the high performance regions and the low performance regions may be created to meet the criteria of a particular application.

The data signal D may carry a block (B) of data (A) to be written to the disk array 124a (e.g., D_BA). The data item D_BA may be written to a track 160, sector or other appropriate area of the first drive 142. The track 160 may be physically located within the high performance region 154 of the medium 148 for the first drive 142. The track 160 is generally addressable in the first address range 110.

The circuit 144 may be implemented as a mirror circuit. The mirror circuit 144 may generate a copy (e.g., FT_BA) of the data item D_BA. The data item copy FT_BA may be written to a track 162 of the second drive 144. The track 162 may be physically located within the low performance region 156 of the medium 148 for the second drive 144. The track 162 is generally addressable in the second address range 112. Therefore, a write to the disk array 124a may store the data item D_BA in the higher performance region 154 of the first disk drive 142 and the data item copy FT_BA in the low performance region 156 of the second disk drive 144. An access to the disk array 124a to read the data item D_BA may primarily access the track 160 from the first disk drive 142 instead of the track 162 from the second disk drive 144. If the first drive 142 fails, the multiplexer 146 may generate the signal D by routing the data item copy FT_BA from the second drive 144.

As the high performance region 154 of the first drive 142 becomes full, additional data items may be written to the high performance region 154 of the second drive 144. Conversely, additional mirrored (fault tolerance) data items may be stored in the low performance region 156 of the first drive 142. For example, a second data item (e.g., D_XB) may be read from a track 164 in the high performance region 154 of the second drive 144. Substantially simultaneously, a second data item copy (e.g., FT_XB) may be read from a track 166 within the low performance region 156 of the first drive 142. The multiplexer 146 generally returns the second data item D_XB to the controller circuit 122 as a block (B) for the second data item (B) (e.g., D_BB). If the second drive 144 fails, the multiplexer 146 may route the mirrored second data item FT_XB to present the second data item D_BB.

Since the (primary) tracks 160 and 164 are located in the high performance regions 154 and the (fault tolerance) tracks 162 and 166 are located in the low performance regions 156 of the drives 142 and 144, respectively, random accesses to the data stored in the tracks 160 and 164 are generally faster than random accesses to the mirror data stored in the tracks 162 and 166. As such, a read performance of the apparatus 140 may be improved as compared with conventional RAID 1 systems.

Figure 5:
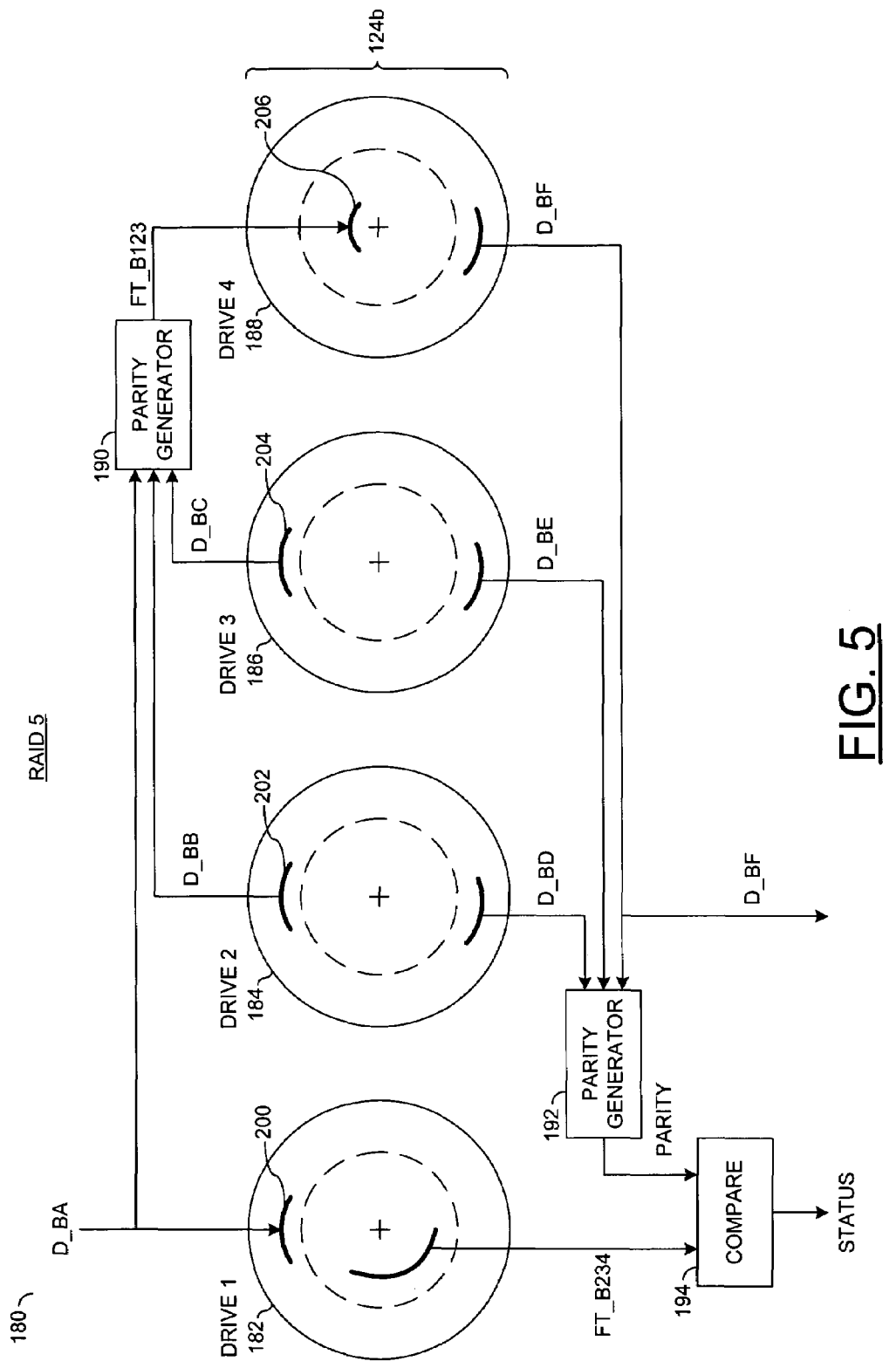
FIG. 5 is a block diagram of an example implementation for a RAID 5 apparatus.

Referring to FIG. 5, a block diagram of an example implementation for a RAID 5 apparatus 180 is shown. The disk array 124 for the RAID 5 apparatus 180 generally comprises a drive 182, a drive 184, a drive 186 and a drive 188 (e.g., collectively a disk array 124b). The controller 122 for the RAID 5 apparatus 180 generally comprises a circuit (or block) 190, a circuit (or block) 192 and a circuit (or block) 194. The circuit 190 may be implemented as a parity generator circuit. The circuit 192 may also be implemented as a parity generator circuit. The circuit 194 may be implemented as a compare circuit. In one embodiment, the parity generator circuit 190 and the parity generator circuit 192 may be the same circuit.

The parity generator circuit 190 may be operational to generate a parity item from three tracks at the same rank (e.g., address) from three of the drives 182–188. The parity item may be error detection information and optionally an error correction block of information. The parity item may be written to the fourth of the drives 182–188.

As illustrated in the example, the parity generator circuit 190 may generate a parity item, also referred to as a fault tolerance block (e.g., FT_B123), based on data stored in the first drive 182, the second drive 184 and the third drive 186. In particular, the parity generator circuit 190 may receive the data item D_BA being written to a track 200 in the high performance region 154 of the first drive 182. A block for a second data item (e.g., D_BB), previously stored in a track 202 within the high performance region 154 of the second drive 184, may also be presented to the parity generator circuit 190. A block for a third data item (e.g., D_BC), previously stored in a track 204 within the high performance region 154 of the third drive 186, may be received by the parity generator circuit 190. The fault tolerance block FT_B123 may be conveyed to the fourth drive 188 for storage in a track 206 within the low performance region 156. The parity generator circuit 192 may include a first-in-first-out buffer (not shown) to temporarily queue portions of the fault tolerance block FT_B123 while the fault tolerance block FT_B123 is being written to the relatively slower low performance region 156 of the fourth drive 188. Since the track 206 is at a different radius from the axis of rotation 152 than the tracks 200, 202 and 204, writing of the fault tolerance block FT_B123 may be performed asynchronously with respect to writing the data item D_BA.

The parity generator circuit 192 and the compare circuit 194 may be utilized to read from the disk array 124b. For example, a data item (e.g., D_BF) may be read from the fourth drive 188. Reading the data item D_BF may include reading other data items (e.g., D_BD and D_BE) from the second drive 182 and the third drive 186 at the same rank. The parity generator circuit 192 may generate a block for a parity item (e.g., PARITY) based upon the three received data items D_BD, D_BE and D_BF. Substantially simultaneously, a fault tolerance block (e.g., FT_B234) may be read from the low performance region 156 of the first drive 182. The compare circuit 194 may compare the fault tolerance block FT_B234 with the calculated parity item PARITY. If the fault tolerance block FT_B234 is the same as the parity item PARITY, the compare circuit 194 may assert the signal STATUS in the logical TRUE state. If the compare circuit 194 detects one or more discrepancies between the fault tolerance block FT_B234 and the parity item PARITY, the signal STATUS may be deasserted to the logical FALSE state. Repair of a faulty data item D_BF may be performed per conventional RAID 5 procedures. Replacement of a drive 182–188 may also be performed per conventional RAID 5 procedures with the exceptions that reconstructed data may only be stored in the high performance regions 154 and fault tolerance (parity) information may only be stored in the low performance regions 156 of the replacement disk.

Figure 6:
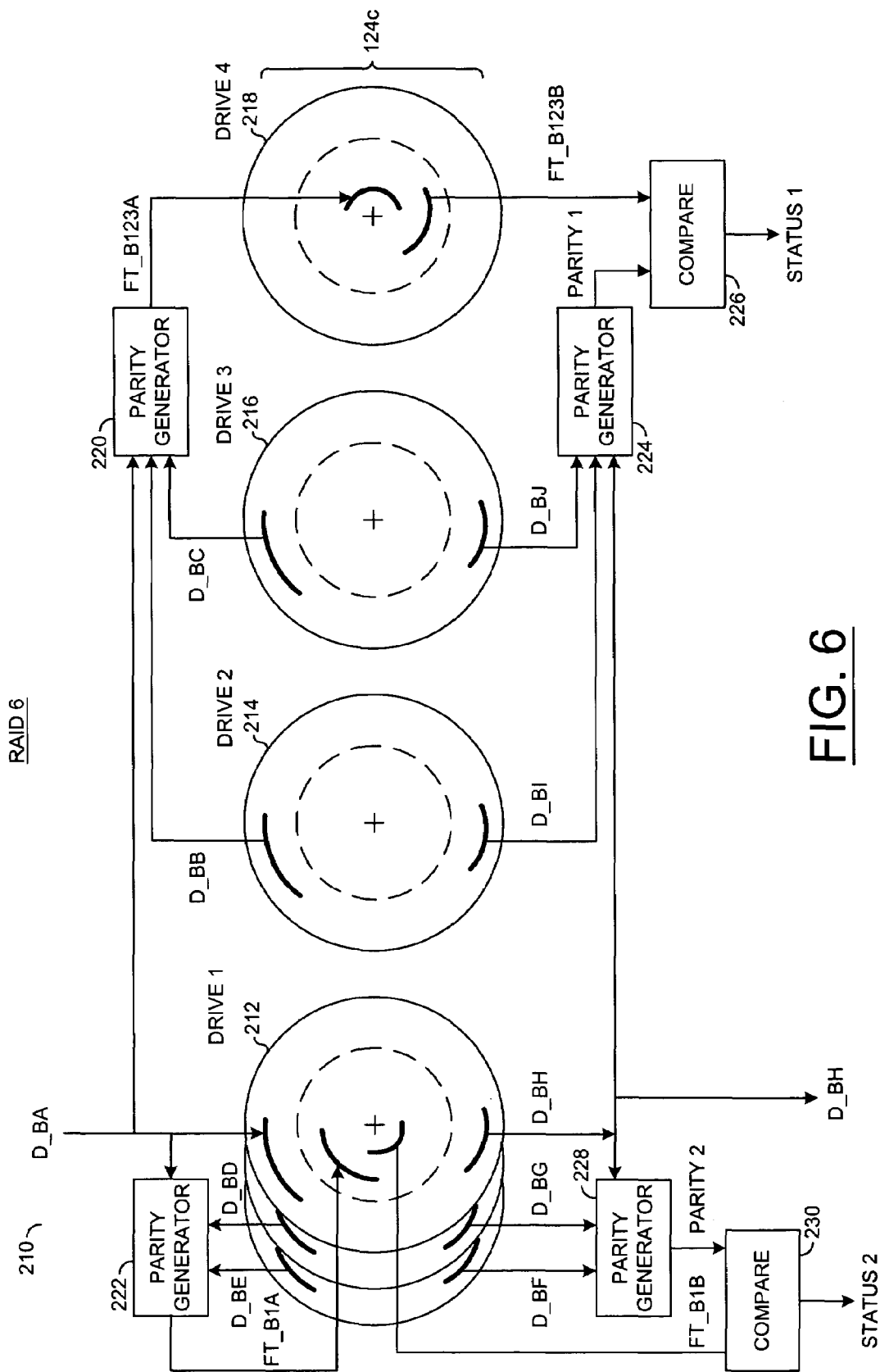
FIG. 6 is a block diagram of an example implementation of a RAID 6 apparatus.

Referring to FIG. 6, a block diagram of an example implementation of a RAID 6 apparatus 210 is shown. The disk array 124 for the RAID 6 apparatus 210 generally comprises a drive 212, a drive 214, a drive 216 and a drive 218 (e.g., collectively a disk array 124c). The controller 122 for the RAID 6 apparatus 210 generally comprises a circuit (or block) 220, a circuit (or block) 222, a circuit (or block) 224, a circuit (or block) 226, a circuit (or block) 228 and a circuit (or block) 230. The circuits 220, 222, 224 and 228 may each be implemented as parity generator circuits. The circuits 226 and 230 may each be implemented as compare circuits. In one embodiment, the parity generator circuit 222, the parity generator circuit 228 and the compare circuit 230 may be implemented as part of each drive 212–218.

An example write of the data item D_BA generally involves writing to the high performance region 154 of the first drive 212. Substantially simultaneously, the parity generator circuit 220 may receive the data item D_BA and additional data items (e.g., D_BB and D_BC) at the same rank (e.g., address) from two other drives (e.g., 214 and 216). Similar to the RAID 5 apparatus 180 (FIG. 5), the parity generator circuit 220 may generate a fault tolerance block (e.g., FT_B123A) that is subsequently stored in the low performance region 156 of the fourth drive (e.g., 218). Furthermore, the parity generator circuit 222 may generate a second fault tolerance block (e.g., FT_B1A) based on the data item block D_BA and other data item blocks (e.g., D_BD and D_BE) previously stored in the same tracks of the first drive 212 on different disks. The fault tolerance block FT_B1A may be stored within the low performance region 156 of the first drive 212.

An example read of a data item (e.g., D_BH) from the first drive 212 generally includes reading other data items (e.g., D_BI and D_BJ) at the same rank from two other drives (e.g., 214 and 216), a first fault tolerance block (e.g., FT_B123B) from the low performance region 156 of the fourth drive (e.g., 218) and a second fault tolerance block (e.g., FT_B1B) from the low performance region 156 of the first drive 212. The parity generator circuit 224 may be operational to compare the data items D_DH, D_BI and D_BJ at the same rank to generate a first parity item (e.g., PARITY1). The compare circuit 226 may compare the first parity item PARITY1 with the first fault tolerance block FT_B123B to determine a first portion of the status signal (e.g., STATUS1). Substantially simultaneously, the parity generator circuit 228 may generate a second parity item (e.g., PARITY2) based on the data items D_BH, D_BF and D_BG stored in the same tracks of the first drive 212 on different disks. The compare circuit 230 may compare the second parity item PARITY2 with the fault tolerance block FT_B1B read from the low performance region 156 of the first drive 212 to determine a second portion of the status signal (e.g., STATUS2).

Figure 7:
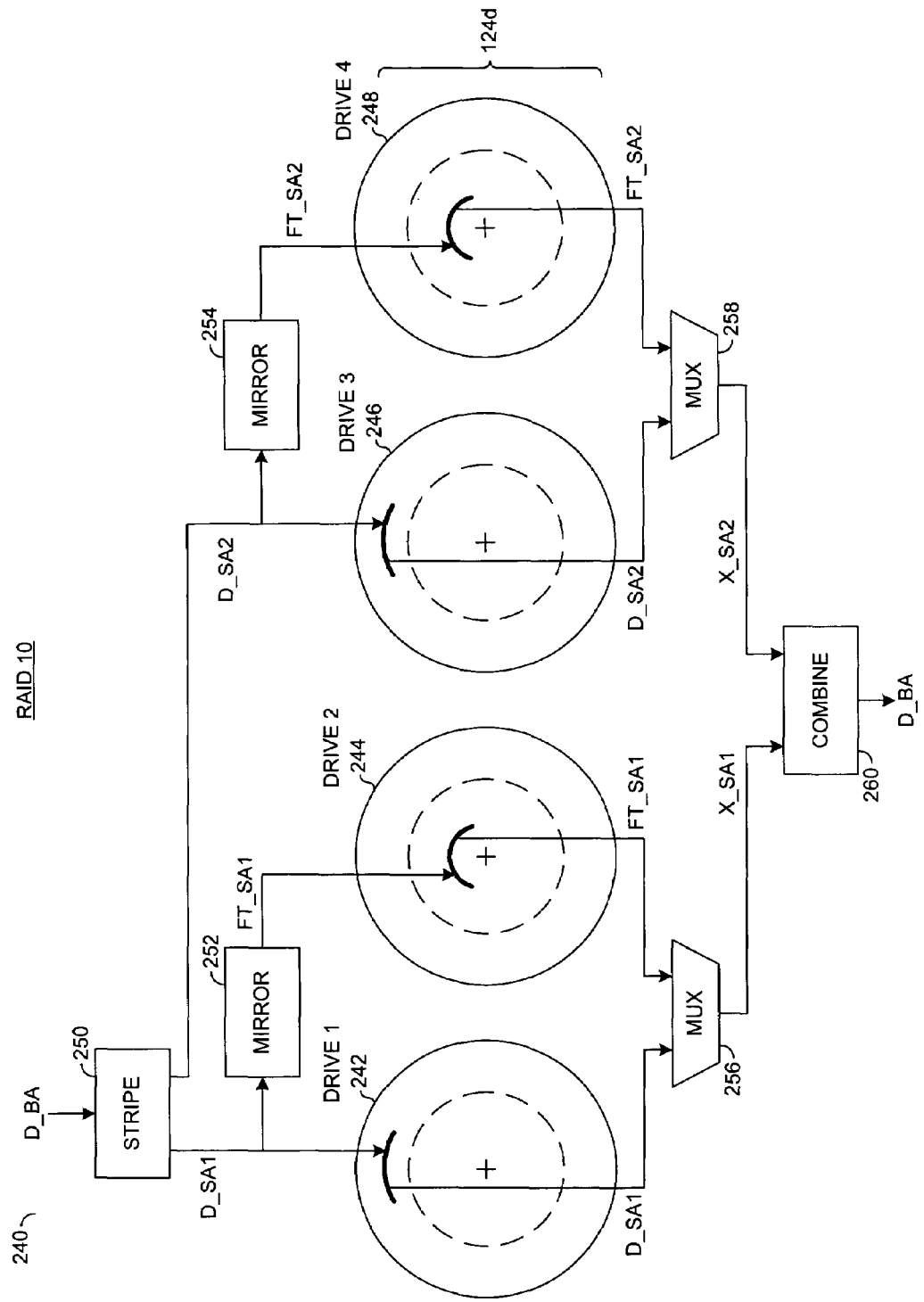
FIG. 7 is a block diagram of an example implementation of a RAID 10 apparatus.

Referring to FIG. 7, a block diagram of an example implementation of a RAID 10 apparatus 240 is shown. The disk array 124 for the RAID 10 apparatus 240 generally comprises a drive 242, a drive 244, a drive 246 and a drive 248 (e.g., collectively a disk array 124d). The controller 122 for the RAID 10 apparatus 230 generally comprises a circuit (or block) 250, a circuit (or block) 252, a circuit (or block) 254, a multiplexer 256, a multiplexer 258 and a circuit (or block) 260.

The block 250 may be implemented as a stripe circuit. The stripe circuit 250 may be operational to convert the data item D_BA from a block form to a stipe form. Each circuit 252 and 254 may be implemented as a mirror circuit. The circuit 260 may be operational to transform data in stripe form back into the block form.

The stripe circuit 250 may transform the data item D_BA into a first stripe data (e.g., D_SA1) and a second stripe data (e.g., D_SA2). The mirror circuit 252 may generate a first fault tolerance stripe (e.g., FT_SA1) by copying the first stripe data D_SA1. The mirror circuit 254 may generate a second fault tolerance stripe (e.g., FT_SA2) by copying the second stripe data D_SA2. The first drive 242 may store the first stripe data D_SA1 in the high performance region 154. The second drive 244 may store the first fault tolerance stripe FT_SA1 in the low performance region 156. The third drive 246 may store the second stripe data D-SA2 in the high performance region 154. The fourth drive 248 may store the second fault tolerance stripe FT_SA2 in the low performance region 156.

During a normal read, the first data stripe D_SA1 may be read from the first drive 242 and the second data stripe D_SA2 may be read from the third drive 246. The multiplexers 256 and 258 may generate stripe items (e.g., X_SA1 and X_SA2) by routing the individual data stripes D_SA1 and D_SA2, respectively. The combine circuit 260 may regenerate the data item block D_BA from the stripes X_SA1 (e.g., D_SA1) and X_SA2 (e.g., D_SA2).

During a data recovery read, the first fault tolerance stripe FT_SA1 may be read from the second drive 244 and the second fault tolerance stripe FT_SA2 may be read from the fourth drive 248. The multiplexers 256 and 258 may route the fault tolerance stripes FT_SA1 and FT_SA2 to the combine circuit 260. The combine circuit 260 may reconstruct the data item block D_BA from the stipes X_SA1 (e.g., FT_SA1) and X_SA2 (e.g., FT_SA2).

Figure 8:
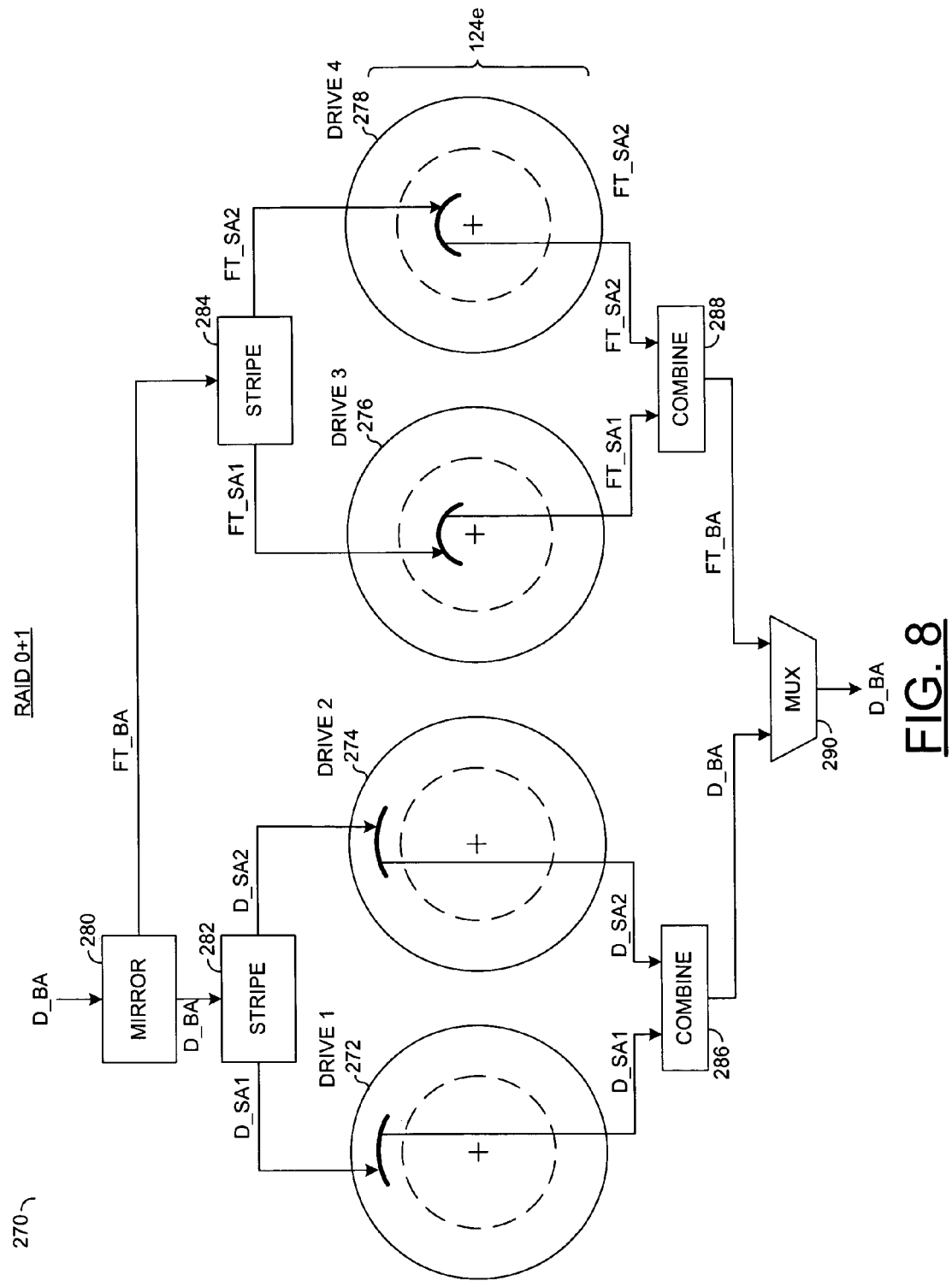
FIG. 8 is a block diagram of an example implementation of a RAID 0+1 apparatus.

Referring to FIG. 8, a block diagram of an example implementation of a RAID 0+1 apparatus 270 is shown. The disk array 124 for the RAID 0+1 apparatus 270 generally comprises a drive 272, a drive 274, a drive 276 and a drive 278 (e.g., collectively a disk array 124e). The controller 122 for the RAID 0+1 apparatus 270 generally comprises a circuit (or block) 280, a circuit (or block) 282, a circuit (or block) 284, a circuit (or block) 286, a circuit (or block) 288 and a multiplexer 290.

The circuit 280 may be implemented as a mirror circuit. The mirror circuit 280 may generate a mirror data item (e.g., FT_BA) by copying the data item D_BA. Each circuit 282 and 284 may be implemented as stripe a circuit. The stripe circuit 282 may stripe the data item D_BA to generate multiple data stripes (e.g., D_SA1 and D_SA2). The stripe circuit 284 may stripe the fault tolerance block FT_BA to generate multiple parity stripes (e.g., FT_SA1 and FT_SA2). The first data stripe D_SA1 may be stored in the high performance region 154 of the first drive 272. The second data stripe D_SA2 may be stored in the high performance region 154 of the second drive 274. The first parity stripe FT_SA1 may be stored in the low performance region 156 of the third drive 276. The second parity stripe FT_SA2 may be stored in the low performance region 156 of the fourth drive 278. Once the drives 272–278 are approximately half full of data, the mirror circuit 280 may be operational to route the data item D_BA to the stripe circuit 284 for storage in the high performance regions 154 of the third drive 276 and the fourth drive 278. Likewise, the mirrored data FT_BA may be sent to the stipe circuit 282 for storage in the low performance regions 156 of the first drive 272 and the second drive 274.

Each circuit 286 and 288 may be implemented as a combine circuit that reassembles stripes back into blocks. The combine circuit 286 may be operational to regenerate the data item D_BA from the data stripes D_SA1 and D_SA2. The combine circuit 288 may be operational to regenerate the fault tolerance block FT_BA from the stripes FT_SA1 and FT_SA2. The multiplexer 290 may be configured to return one of the regenerated data item D_BA or the regenerated fault tolerance block FT_BA as the read data item D_BA.

The mapping scheme of the present invention may be generally applied to any RAID level. However, the performance gain may depend on the amount of media used to store parity/fault tolerance information. The various signals of the present invention are generally TRUE (e.g., a digital HIGH, "on" or 1) or FALSE (e.g., a digital LOW, "off" or 0). However, the particular polarities of the TRUE (e.g., asserted) and FALSE (e.g., de-asserted) states of the signals may be adjusted (e.g., reversed) accordingly to meet the design criteria of a particular implementation. As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:
   a plurality of disk drives each having a first region and a second region, wherein said first regions have a performance parameter faster than said second regions; and
   a controller configured to (i) write a first data block at a particular address in said first region of a first drive of said disk drives, (ii) read a second data block from said particular address of a second drive of said disk drives, (iii) calculate a first parity item based on said first data block and said second data block and (iv) write said first parity item in said second region of a third drive of said disk drives.

2. The apparatus according to claim 1, wherein said first region for each of said disk drives comprises an annular area of a storage medium proximate an outer edge of said storage media.

3. The apparatus according to claim 2, wherein said second region for each of said disk drives comprise an area of said storage medium between said first region and a rotational axis of said storage medium.

4. The apparatus according to claim 1, wherein said disk drives comprise a redundant array of inexpensive disks level 5.

5. The apparatus according to claim 1, wherein said disk drives comprise a redundant array of inexpensive disks level 6.

6. The apparatus according to claim 1, wherein said performance parameter is a bit transfer rate to a storage medium within said disk drives.

7. A method for operating a plurality of disk drives, comprising the steps of:
   (A) partitioning an address range for said disk drives into a first range and a second range, where said first range has a performance parameter faster than said second range;
   (B) writing a first data block at a particular address in said first range of a first drive of said disk drives;
   (C) reading a second data block from said particular address of a second drive of said disk drives;
   (D) calculating a first parity item based on said first data block and said second data block; and
   (E) writing said first parity item in said second range of a third drive of said disk drives.

8. The apparatus according to claim 1, wherein said controller is further configured to (i) write said first data block in a first disk of said first drive, (ii) read a third data block from said predetermined address of a second disk of said first drive, (iii) calculate a second parity item based on said first data block and said third data block and (iv) store said second parity item in said second region of said first drive.

9. The apparatus according to claim 8, wherein said controller is further configured to write said second parity item in said first disk of said first drive.

10. The method according to claim 7, wherein said performance parameter is a bit transfer rate to a storage medium within said disk drives.

11. The method according to claim 7, wherein said first data block is written in a first disk of said first drive, the method further comprising the steps of:
    reading a third data block from said predetermined address of a second disk of said first drive;
    calculating a second parity item based on said first data block and said third data block; and
    storing said second parity item in said second range of said first drive.

12. The method according to claim 11, wherein said second parity item is written in said first disk of said first drive.

13. A method for operating a plurality of disk drives, comprising the steps of:
    (A) partitioning an address range for said disk drives into a first range and a second range, where said first range has a performance parameter faster than said second range;
    (B) generating both a second data block and a third data block by stripping a first data block;
    (C) writing said second data block in said first range of a first drive of said disk drives;
    (D) writing said third data block in said first range of a third drive of said disk drives;
    (E) generating a first mirrored data block by mirroring said first data block; and
    (F) writing said first mirrored data block in said second range of a second drive of said disk drives.

14. The method according to claim 13, further comprising the step of:
    generating both a second mirrored data block and a third mirrored data block by stripping said first mirrored data block, wherein the step of writing said first mirrored data block comprises the sub-steps of:
    writing said second mirrored data block in said second drive; and
    writing said third mirrored data block in a fourth drive of said disk drives.

15. The method according to claim 13, wherein said performance parameter is a bit transfer rate to a storage medium within said disk drives.

16. The method according to claim 13, wherein said disk drives comprise a redundant array of inexpensive disks level 0+1.

* * * * *